United States Patent [19]
Fremont

[11] 3,726,251
[45] Apr. 10, 1973

[54] FISH REARING TANK

[75] Inventor: Howard J. Fremont, New York, N.Y.

[73] Assignee: Marine Protein Corporation, New York, N.Y.

[22] Filed: Oct. 23, 1970

[21] Appl. No.: 83,356

[52] U.S. Cl. ................................................... 119/3
[51] Int. Cl. ............................................. A01k 63/00
[58] Field of Search .................................... 119/3, 5

[56] References Cited

UNITED STATES PATENTS

| | | | |
|---|---|---|---|
| 136,834 | 3/1873 | Holton | 119/3 |
| 3,166,043 | 1/1965 | Castillo | 119/3 |
| 2,944,513 | 7/1960 | Keely | 119/3 |
| 180,085 | 7/1876 | Wilmot | 119/3 |
| 475,082 | 5/1892 | Gunther | 119/5 |
| 880,783 | 3/1908 | Erlwein et al. | 119/5 |

OTHER PUBLICATIONS

Keen Buss, Jack Miller & Kenneth Corl "Innovations For Fish Culturists" 1968 Pages 1–6

*Primary Examiner*—Hugh R. Chamblee
*Attorney*—Kenyon & Kenyon Reilly Carr & Chapin

[57] ABSTRACT

A large silo-like tank with a closed top and an interior overflow arrangement in which fish are grown at very high densities in an environment of substanially continuously flowing water and with a continuous input of additional oxygen. A series of portholes are disposed in the wall of the tank and vertically or diagonally spaced from one another. These portholes are normally covered with porthole covers. When harvesting the fish, the porthole covers are successively removed and the water in the respective portions of the tank flows out carrying the fish therewith to the level of the bottom of the porthole. Successive porthole covers are removed until all or a desired portion of the fish in the tank are harvested. In this fashion, the rate of flow of water during harvesting is minimized and consequently damage to the fish is minimized.

11 Claims, 2 Drawing Figures

INVENTOR.
HOWARD J. FREMONT
BY
ATTORNEY

FISH REARING TANK

This invention relates in general to fish rearing tanks and more particularly to a fish rearing tank that is adapted to provide an efficient and effective means for harvesting fish raised at high densities.

BACKGROUND OF THE INVENTION

Recent developments in the raising of fish at high density indicate that an approach to raising fish in a large container under controlled environmental conditions is both technically and economically feasible. By having a continuous rapid flow of water through the tank with a continuous supply of oxygen to keep the dissolved oxygen content of the water at as high a level as possible, it becomes possible to raise fish at very high densities.

In order to be economically efficient, the fish raising must take place at a site where large volumes of clean water are available. For various cost considerations, including the cost of land, it has been found desirable to raise fish in very tall tanks which have an appearance much like the appearance of a silo.

The high density of fish in the tanks is from about 0.5 pounds per gallon of space up to about 2 pounds per gallon and under high oxygen conditions could be as high as 3 pounds per gallon. The usual range is about 1.25 pounds of fish per gallon of space in the tank. In addition the high density process of the present invention includes the water flow rate through the tank of from about 10 to about 20 pounds of fish per gallon of water per minute per tank.

One of the problems with the silo-like tank arrangement is that it is difficult to harvest the grown fish. It is impossible to simply flush the fish out of the bottom of these tall silo-like tanks by opening a gate at the bottom of the tank since the pressure of the water would produce a flow-pressure combination that would crush and destroy the fish. Alternatively, harvesting the fish from the top of the tank becomes difficult and time consuming since many of the fish will be near the bottom of the tank. Elevator nets and other such arrangements tend to be expensive and require mechanisms that take up valuable tank space.

Accordingly, it is one of the major purposes of this invention to provide a tank design which will permit the rapid and efficient harvesting of the fish from the entire tank once the fish have grown to the size where harvesting is desirable.

It is an important related purpose of this invention to provide a tank that will perform this major function without greatly increasing the cost of the tank.

It is a further related purpose of this invention to provide such a tank that will be relatively trouble free and require minimum maintenance during the course of the growing of the fish in the tank.

Under many circumstances when fish are grown at high densities in large tanks, it will be desirable and even necessary to harvest part of the fish population before the fish achieve their full growth. Fish will be grown in these large tanks from fingerling size to adult size. The most efficient and economic use of the facilities and water supply will frequently dictate that there be as high a density of fish as is possible over a wide range of the growth of the fish. Thus it will be necessary to harvest a portion of the young fish in order to provide room for further growth of the remaining fish. It may be both desirable and necessary to harvest a portion of the fish during a number of stages of growth from fingerling to full adult size. Partial harvesting raises many of the some problems mentioned above in connection with complete harvesting.

Accordingly, it is a further important purpose of this invention to provide a tank design which will permit a rapid and efficient partial harvesting of fish whenever desired.

In addition, another purpose of the invention is to provide means for enhancing growth and development of fish through control of the light intensity, color and exposure within the tank, including variation of the relative duration of light and darkness.

BRIEF DESCRIPTION OF THE INVENTION

In brief, this invention involves a tall tank having a series of vertically displaced portholes. The portholes are covered by removable transparent porthole covers so that during the course of raising the fish, as well as during the harvesting, an operator can see through the porthole covers in order to determine the condition of the fish at different levels. The porthole covers are removable so that a progressive harvesting of the fish can be undertaken without damage to the fish involved. In addition, the tank has a bottom center feed of water at large volume so that water flows up from the bottom of the tank toward the top of the tank and out the top of the tank over a gutter arrangement. The flow of water is at a sufficient rate to keep the water environment clean when the fish are very densely packed. At the bottom of the tank fine particle oxygen bubbles may be continuously fed into the tank in order to maintain the dissolved oxygen content of the water at as high a level as possible, or other methods may be used to achieve and maintain a higher than normal dissolved oxygen content in the water.

BRIEF DESCRIPTION OF THE DRAWINGS

Other objects and purposes of this invention will become apparent from the following detailed description of the invention, in which.

DETAILED DESCRIPTION OF THE PREFERRED EMBODIMENTS

Figure 1:
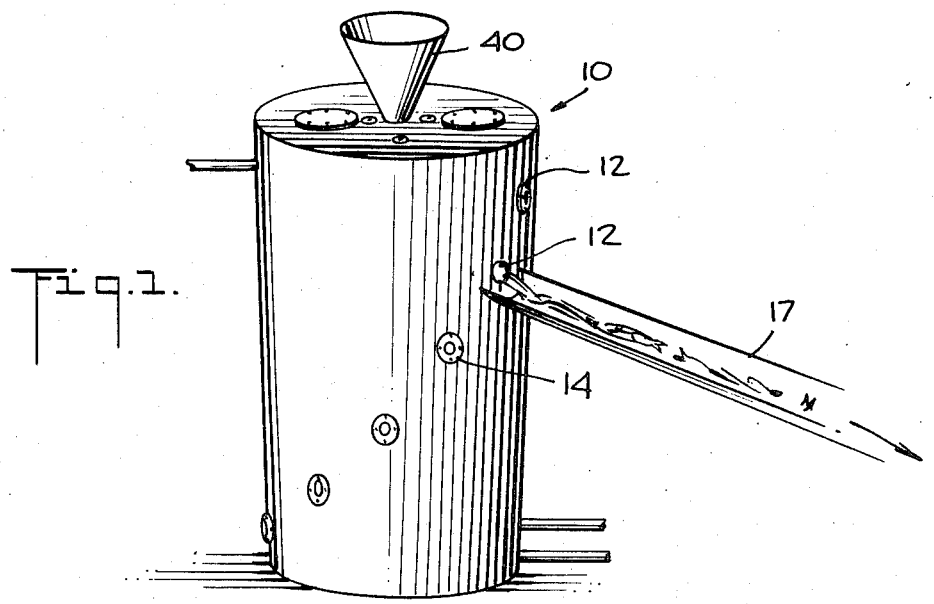
FIG. 1 is a perspective view of an embodiment of this invention showing a series of portholes along the length of the tank.

As can be seen in the figures, one embodiment of this invention is shown in a tank 10 which has a series of vertically displaced portholes 12. Porthole covers 14 are preferably transparent so that the operator can view the condition and contents of the tank on any desired periodic basis and particularly so that the condition of the contents of the tank can be viewed at harvesting times.

In one embodiment, the tank 10 may be twenty feet tall and ten feet in diameter. A series of portholes 12, each having a diameter of eighteen inches and having a center to center vertical displacement from each other of three feet would be effective to do the required job.

The simplest and most efficient general way to harvest fish grown at the high densities referred to above is to flush them out of the tank. However, the high pressure that exists at the bottom of a twenty foot high tank means that the flow rate upon opening a gate at the bottom of the tank would seriously damage most of the fish and probably completely destroy much of the fish. The series of portholes 12 can be employed to avoid this problem without introducing a great deal of hand labor or complicated harvesting machinery.

It is necessary that the portholes 12 be opened, one at a time, in a sequence starting from the top porthole. Opening the top porthole will permit water from the top of the tank down to the level of the top porthole to flow out and carry out the fish at that level in the tank. The pressure differential over the few feet involved is not enough to cause a flow rate that will significantly damage the fish involved. After the fish in the top level of the tank are thus harvested, the second porthole is opened so that another few feet of water will flow out carrying another portion of the fish contained. This procedure is continued until the entire tank is emptied. As a result, all of the fish held in the tank are harvested in a simple, efficient and uncomplicated fashion.

Where it is desired to harvest a portion of the fish, then only one or two of the portholes, again starting from the top down, need be opened. After the desired portion of the fish has been harvested, the porthole covers 14 are securely fastened over the portholes involved and the water which is flowing from the bottom of the tank up through the tank will rise to the top level of the tank, as determined by the level of the gutter 16 (see FIG. 2).

The porthole covers 14 can be attached over the portholes by a series of bolts. The amount of pressure exerted by the water head will average under three feet when the portholes are opened in sequence. This magnitude of pressure is not so great that an operator will be hampered or endangered in removing the porthole cover 14.

It might be desirable to attach either an open inclined trough or chute 17 or conduit to the opened porthole so that the water and fish carried out the porthole can be directed to an appropriate transportation tank or other receptacle.

Figure 2:
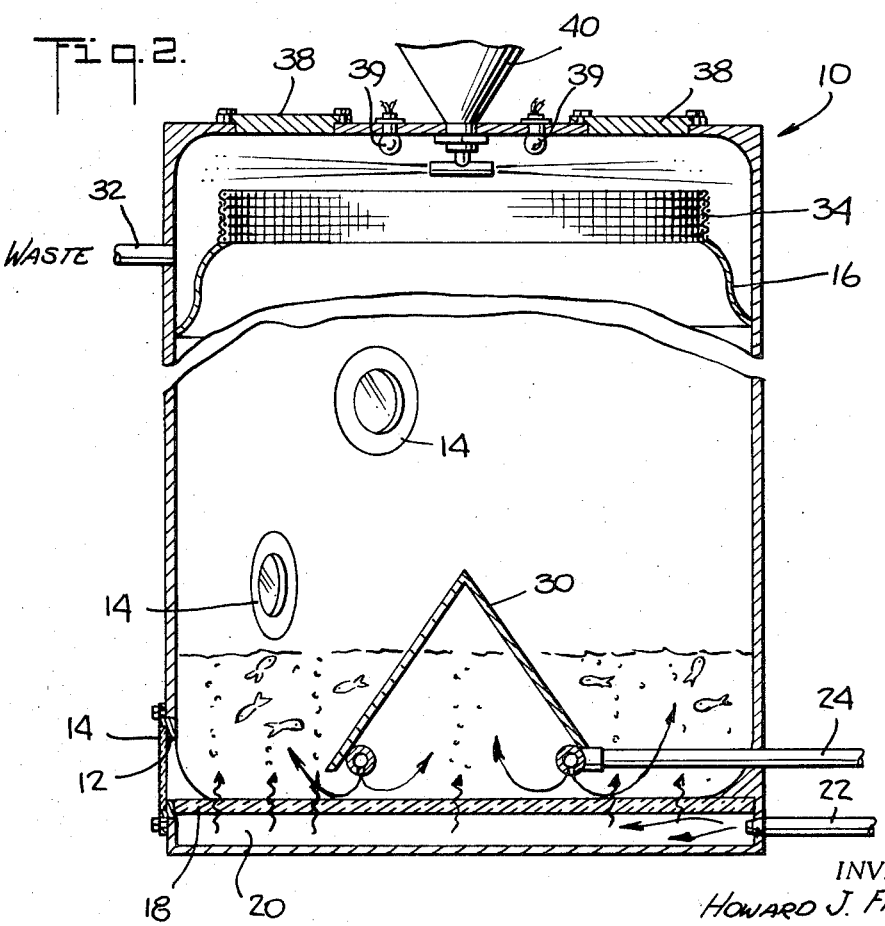
FIG. 2 is a mechanical schematic upright sectional view of the FIG. 1 tank showing the arrangement of and relationship between the major components of the tank.

FIG. 2 shows the arrangement of the major components of the tank 10.

The floor 18 of the tank 10 may be composed of a material, such as a fine pore stone, which is porous enough to pass a gas under pressure. Air or oxygen under pressure in a chamber 20 below the floor 18 passes through the Carborundum floor into the water within the tank 10. Air or oxygen is supplied to the chamber 20 through a pipe 22 and is supplied at sufficient pressure so that the air or oxygen will diffuse through the floor 18 to provide a continuous input of oxygen in very fine bubbles to the water in the tank.

As an alternative to the above, oxygen may be added to the water prior to its being pumped into the tank, and the void between the inside top of the tank and the top surface of the water in the tank may also be filled with oxygen to assist in maintaining the level of dissolved oxygen in the water in the tank.

The water itself is introduced into the tank 10 near the bottom thereof and flows from the bottom of the tank up through the tank, thereby serving to flush the tank clean and assure a continuous flow of clean water for the fish in the tank. The water is introduced through an inlet pipe 24 and, in the embodiment shown, is admitted into the tank itself through a series of openings 26 in an annular pipe 28 which is in communication with the inlet pipe 24. The openings 26 are directed downwardly so that the inlet water flows out of the openings 26 against the floor 18 and thence along the floor 18 and up through the entire tank 10. In this fashion, unused food and offal as well as other particles are washed out of the tank.

An optional protective cone 30 may be positioned over the annular pipe 28 to prevent food and waste particles from falling into the center of the tank and gathering there. The water flows up over the ends of an annular gutter 16 which runs around the tank and which channels the water out through an outlet pipe 32. An annular wire mesh screen 34 may be employed at the edge of the gutter 16 in order to trap and catch waste products and other particles so that the outlet water can be used in subsequent tanks for the growing of additional fish.

In the embodiment shown the tank 10 is closed in at the top to protect the contents of the tank from outside contamination. In such an embodiment, one or more manholes 38 are provided so that access can be had to the tank for cleaning and repair purposes.

A feed hopper 40 provides food for the fish in the tank. Feed, however, can be supplied in a number of ways. In some embodiments, some or all of the feed may be supplied with the inlet water to assure a proper distribution of feed in the tank. Alternatively a separate feed inlet pipe (not shown) may be provided at the bottom of the tank to provide intermittent or continuous feed as desired or required.

It should be noted that the position of the lowest one of the portholes 12 is such that when its porthole cover 14 is removed, the porthole itself will extend below the surface of the floor 18. This will assure that when a complete harvesting is made, all of the water and all of the fish in the tank will be removed.

As can be seen from the above description the inside overflow arrangement permits closing the top of the silo which not only keeps out contamination, permits a darker interior or the silo, but also makes the fish in the tank less susceptible to marauding birds and the like. The tank, including the portholes may be opaque to permit the use of interior light sources 39 as shown in FIG. 2 to control the amount of light in the tank and thereby create conditions in the tank which the fish would ordinarily encounter in their natural habitat. Varying the amount of light can, for example, be used to encourage or retard the growth of algae as desired. At times it may be desirable to employ different colored light and to vary the intensity of the light.

The use of the inside overflow arrangement in the tank, in addition to permit closing the top thereof, makes it possible to put a plurality of the silos closer together for more efficient operation of the silos in a sequential system.

While certain embodiments have been shown and described, it is to be understood by those skilled in the art that certain changes and additions may be made without departing from the scope and spirit of the invention. For example, it is contemplated that, instead of using removable porthole covers, whether transparent, translucent or opaque, additional means may be employed such as gate valves, screw caps or plugs, slide valves, or any other similar equivalent device.

What is claimed is:

1. A fish rearing tank having side walls and a bottom and forming a vessel of a size for containing water and a plurality of fish in the water, said side walls having therethrough a plurality of vertically displaced discharge openings, a plurality of said openings being of a size to permit passage of the fish therethrough, and means to selectively close each of said openings, whereby, when the level of the water is above a plurality of said discharge openings, the fish within said tank may be harvested from said tank by sequentially opening a plurality of said openings in a sequence from top to bottom to remove the fish from the tank under only a moderate head of pressure generated by the presence of the water in said tank, to avoid damage to the fish.

2. The tank of claim 1 further comprising:
a water circulation system including bottom inlet means and top exit means for bottom-to-top flow of water through said tank.

3. The tank of claim 2, further comprising:
an annular overflow gutter disposed inside said tank in the upper region thereof and communicating with said exit means.

4. The apparatus of claim 2, further comprising:
screen means at said exit means to filter the effluent from said tank.

5. The tank of claim 4, in which the vertical dimension of said tank is greater than the horizontal dimension thereof.

6. The tank of claim 1, in which the vertical dimension of said tank is greater than the horizontal dimension thereof.

7. The tank of claim 1, in which the vertical spacing between adjacent ones of said discharge openings is less than three feet.

8. The tank of claim 1, further comprising:
an inclinable trough adapted for mounting one end thereof adjacent the outside of one of said openings whereby the contents of the tank in the region of said opening may exit through said opening and along said trough.

9. The tank of claim 1, further comprising:
an inclinable chute adapted for mounting one end thereof adjacent the outside of one of said openings whereby the contents of the tank in the region of said openings may exit through said opening and along said chute.

10. The tank of claim 1, further comprising:
a. a top member mountable on top of said tank for rendering the tank opaque when said top member is in place, and
b. a light source within said tank for controlling the color and intensity of the light within said tank.

11. The tank of claim 1, further comprising:
a fish food hopper mounted in the top region of said tank for dispensing fish food in a controlled manner into said tank.

* * * * *